United States Patent [19]
Jackson et al.

[11] Patent Number: 5,795,426
[45] Date of Patent: Aug. 18, 1998

[54] METHOD AND APPARATUS FOR EFFECTING CONTINUOUS MULTI-DIRECTIONAL LAMINATING

[75] Inventors: Dana B. Jackson; Donald L. Asher, both of Broken Arrow; Ronald G. Halcomb; John E. Vogt, both of Tulsa, all of Okla.

[73] Assignee: Boeing North American, Inc., Seal Beach, Calif.

[21] Appl. No.: 695,817

[22] Filed: Aug. 5, 1996

[51] Int. Cl.$^6$ .............................. B32B 31/10; B32B 35/00
[52] U.S. Cl. .................... 156/249; 156/250; 156/300; 156/302; 156/353; 156/361; 156/510; 156/543; 156/552
[58] Field of Search ..................... 156/177, 178, 156/249, 250, 264, 269, 299, 300, 302, 510, 519, 540, 542, 552, 353, 358, 361, 366, 367, 355, 543

[56] References Cited

U.S. PATENT DOCUMENTS

| | | | |
|---|---|---|---|
| 3,250,655 | 5/1966 | Adler | 156/302 X |
| 3,566,733 | 3/1971 | McLean | |
| 3,616,037 | 10/1971 | Burger | 156/303 |
| 3,682,734 | 8/1972 | Burger | |
| 4,256,522 | 3/1981 | Britton | 156/178 |
| 4,933,039 | 6/1990 | Vittone et al. | 156/177 |
| 4,992,124 | 2/1991 | Kurihara et al. | 156/161 |
| 5,082,701 | 1/1992 | Craven et al. | 428/34.5 |
| 5,173,138 | 12/1992 | Blauch et al. | 156/177 |

*Primary Examiner*—Curtis Mayes
*Attorney, Agent, or Firm*—Lawrence N. Ginsberg; Charles T. Silberberg; Terrell P. Lewis

[57] ABSTRACT

A method and apparatus for moving a first carrier tape in a first direction along a path, and a second tape toward the first tape, both in an incremental manner. After each increment of movement of the first tape, the second tape is advanced a proportional increment into overlying contact with the first tape. A press squeezes the first and second tape layers together, and a cutting mechanism is actuated to sever the overlying segment of second tape. The incremental movements of the first and second tapes are regulated so that the length of each second tape segment laid on the first tape is equal to the distance of travel of the first tape in the first direction. The direction of movement of the first tape is reversed so that at least one layer of second tape can be applied to the first tape.

17 Claims, 6 Drawing Sheets

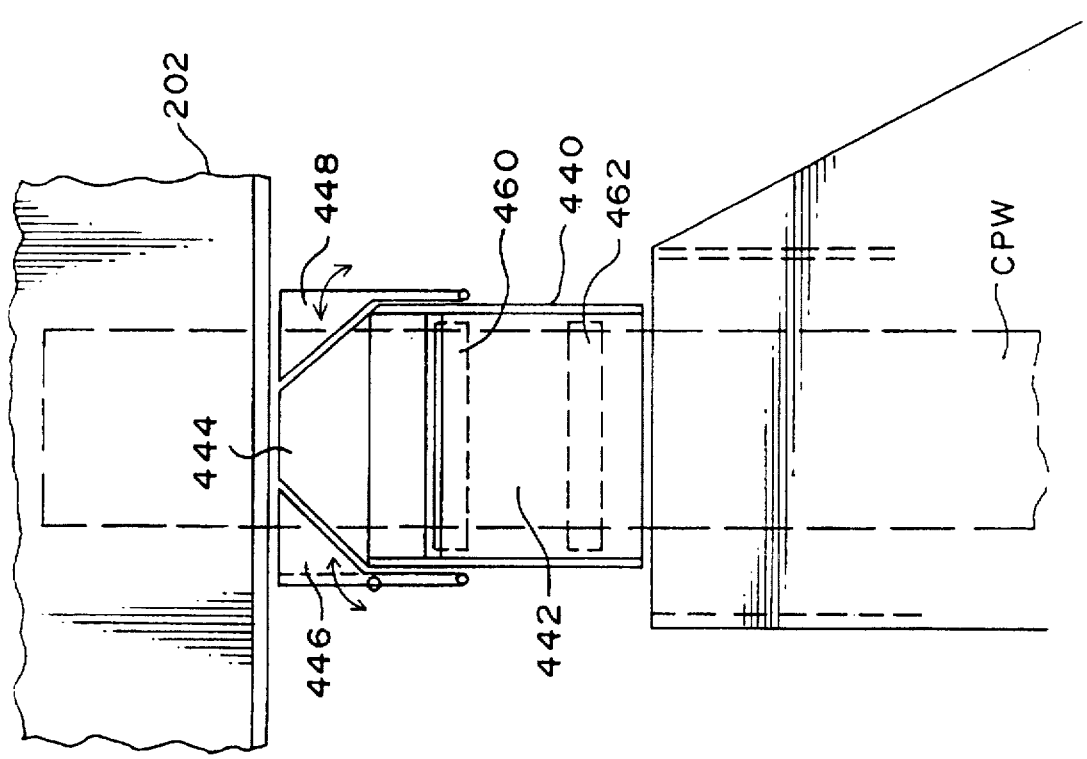

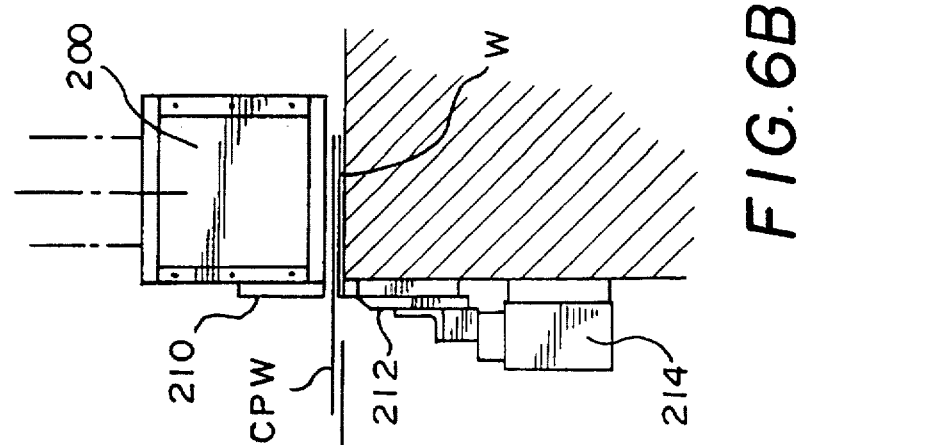
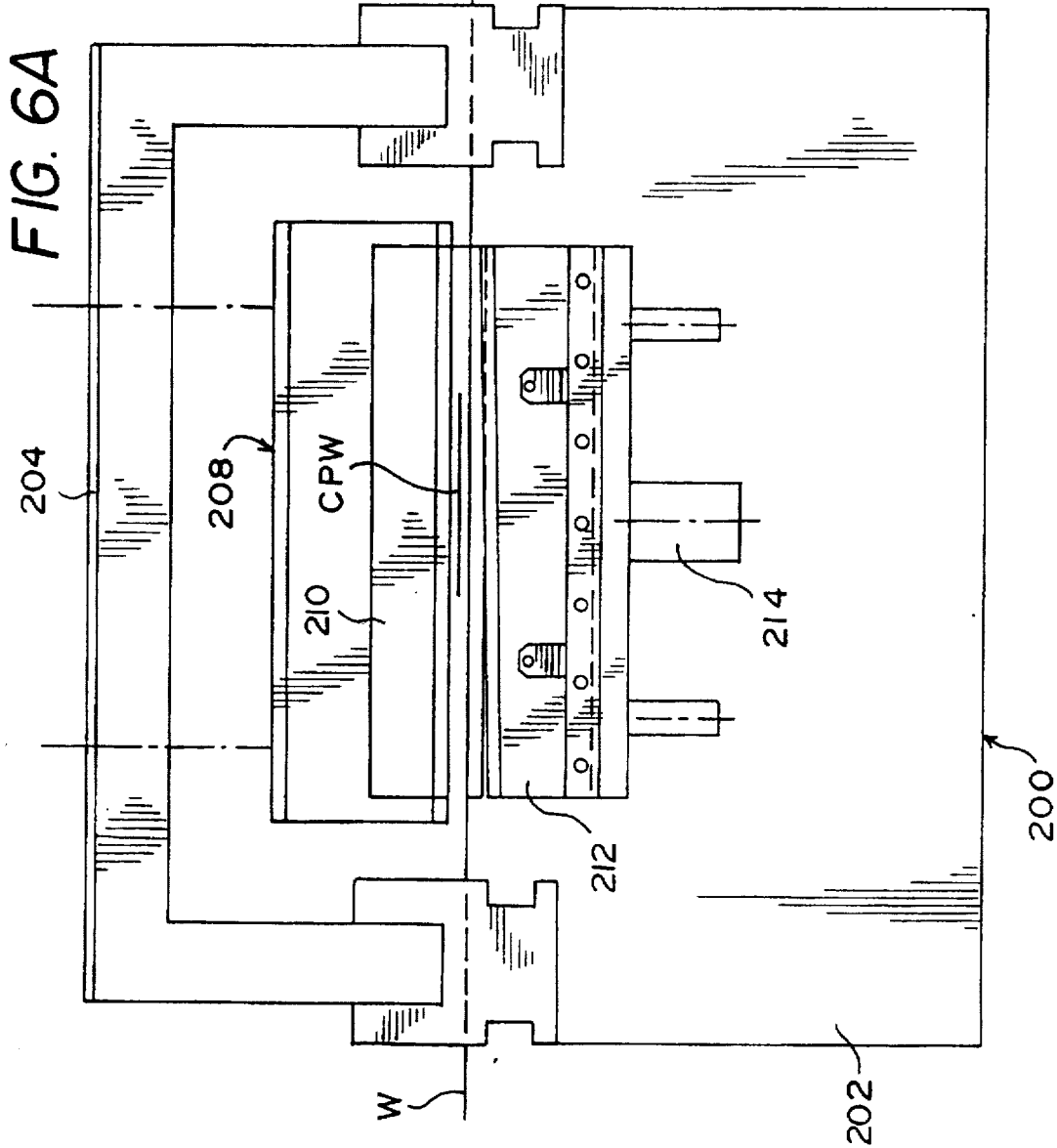

METHOD AND APPARATUS FOR EFFECTING CONTINUOUS MULTI-DIRECTIONAL LAMINATING

BACKGROUND OF THE INVENTION

1. Field of the Invention

The present invention relates to a process and apparatus for the continuous, automatic production of cross-plied materials, preferably composite materials used in the formation of structural members.

2. Description of the Related Art

In the manufacture of structural members from layers of woven materials, including woven materials held in a matrix, it is often desirable to arrange one or more layers of the woven materials at an angle to the longitudinal direction of the carrier web on which the woven materials and matrix are formed. These non-longitudinally disposed fibers act as reinforcing layers in the matrix material, and depending on the angular orientation, impart specific, oftentimes predetermined, property behaviors to the resultant structural members produced.

In the past, however, it has been difficult to handle such reinforcing fibers or webs of fibers due to their light weight and fragile character.

One common approach taken to remedy this problem has been to provide an underlying layer or ply of release material to establish a composite material web.

The known methods and apparatus for building structural members from multiple layers of composite material, where each of the layers includes a rigidifying matrix, use a continuous ply of support material such as release fabric or backing paper to keep each layer isolated from the next until one layer is ready to be placed in overlying relationship to the next. Just prior to that time, the underlying continuous ply of material must be stripped from the layer of composite material in order to prevent the structural member from being built with the support material included.

In the known cross-ply layup operations, removing the release layer from the composite matrix layer is not desired because the apparatus needed requires many extra components (e.g., rollers, splitters and cutters) and increases repair and manufacture time and costs, as well as machine downtime.

Another drawback of the known cross-ply apparatus is that the cutter element used to sever a desired length of cross-plied material which is to be superimposed on the base layer, does not sever the carrier ply. Thus, the severed lengths cannot be laid directly atop an underlying layer until the release ply is removed, thus adding one additional step (and set of related tools) to the process.

Yet another drawback of the known processes and apparatus is that adjacent webs of material are adhered to one another by the use of pinch rollers, a pressure plate, and a heater. Thus, until adjacent layers are determined to be adequately joined to one another, the process cannot proceed. This adds a significant delay time to steps of building up the layers of the structural member. Since all of the known apparatus require that one layer must first be adhered to an underlying layer before a second layer can be added, the prior art teaches that the first two joined layers which have been wound on a spool as a web must be run backwards, so that the beginning of the web now at the center of the take-up spool can be located at the outer circumference of the pay-out spool.

Against this background of known prior art, applicants have developed a new, more efficient, speedier, and cost-effective process for building multi-layer structural members from multiple layers of composite material, some or all of which include reinforcing fibrous materials.

OBJECTS AND SUMMARY OF THE INVENTION

It is therefore an object of the present invention to provide a novel method and apparatus for handling plies of composite material while cross-laying plies of fibrous material therebetween during the layup phase in the production of a composite structural member.

Another object of the present invention to provide a novel method and apparatus for arranging successive layers of reinforced matrix material, one atop the next, so as to create structural members of indeterminate length, while overcoming all the deficiencies and drawbacks of other related processes currently known.

Still another object of the invention is to be able to mount the so-formed indeterminate length, multi-layer structural members on spools to facilitate ease of handling and movement throughout the manufacturing facility.

Still another object of the invention is provide a method and apparatus in which the continuous ply of support material used to rigidify each layer and separate it from the next can be easily removed so the structural member being built does not include the support material.

These and other objects are attained through the present invention wherein a first composite material tape is moved through a cross-ply zone in a first direction in an incremental manner, and after each increment of movement of the first tape, a second tape is advanced toward and into overlying relationship with, the first tape, whereupon a cutting mechanism is actuated and a segment of the second tape is deposited on the first tape. The process is characterized by a sequencing control step in which the incremental movements of the first and second tapes are regulated so that the width of each second tape segment laid on the first tape is equal to the distance of travel of the first tape in the first direction. The direction of movement of the first tape is reversed so that at least one other layer of second tape can be applied to the first tape.

The apparatus of the present invention is modular in construction and the first tape travels from one tape supporting module, across a laminating module, past a cross-ply module for delivering the second tape.

The cross-ply module is pivotably mounted on the laminating module for a range of pivoting movements relative to the longitudinal extent of the first tape so that the second tape can be laid on the first tape at different angular orientations relative to the longitudinal extent of the first tape.

BRIEF DESCRIPTION OF THE DRAWINGS

FIG. 2A is a top view of the web carriage box of the cross-ply assembly shown in FIG. 1;

FIG. 6A is a front view of the cutter assembly of the present invention; and

FIG. 6B is a side view of the cutter assembly shown in FIG. 6A.

DETAILED DESCRIPTION OF THE INVENTION

Figure 1:
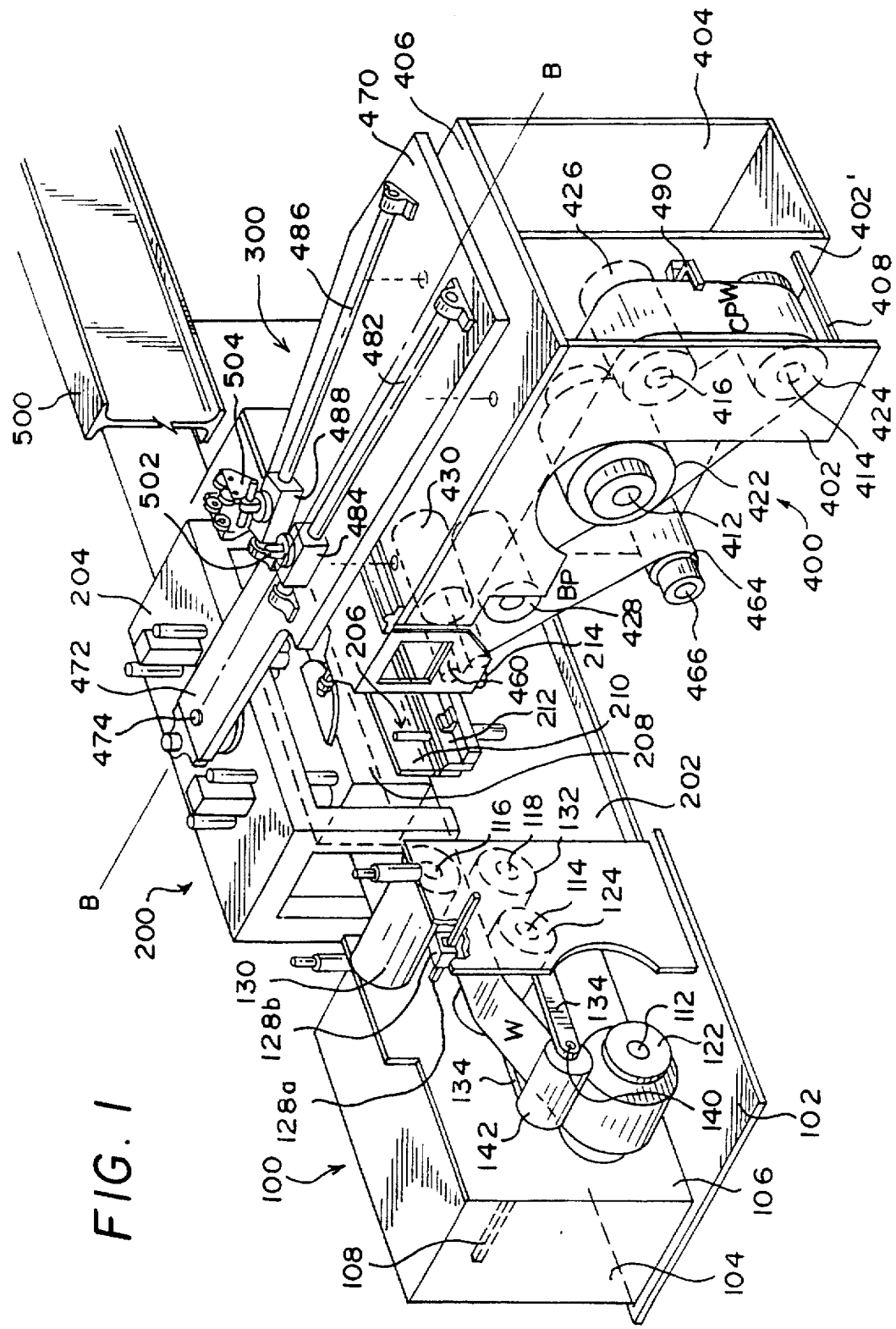
FIG. 1 is perspective view of the cross-ply apparatus of the present invention, showing the first and second modular spool assemblies, a modular lamination assembly and a modular cross-ply assembly.

The following detailed description is of the best currently contemplated modes of carrying out the invention. The description is not to be taken in a limiting sense, but is made merely for the purpose of illustrating the general principles of the invention, since the actual scope of the invention can be best determined by the appended claims.

Throughout this detailed description, similar elements or parts in the various views of the drawings are designated by the same or similar reference characters. As used in this description, a "ply" is one layer of material, and the terms "cross-ply" or "cross-plied material" denote two or more superimposed layers of material where the fiber lengths of adjacent layers are disposed relative to one another at angles of other than 180° and 360°.

Figure 2:
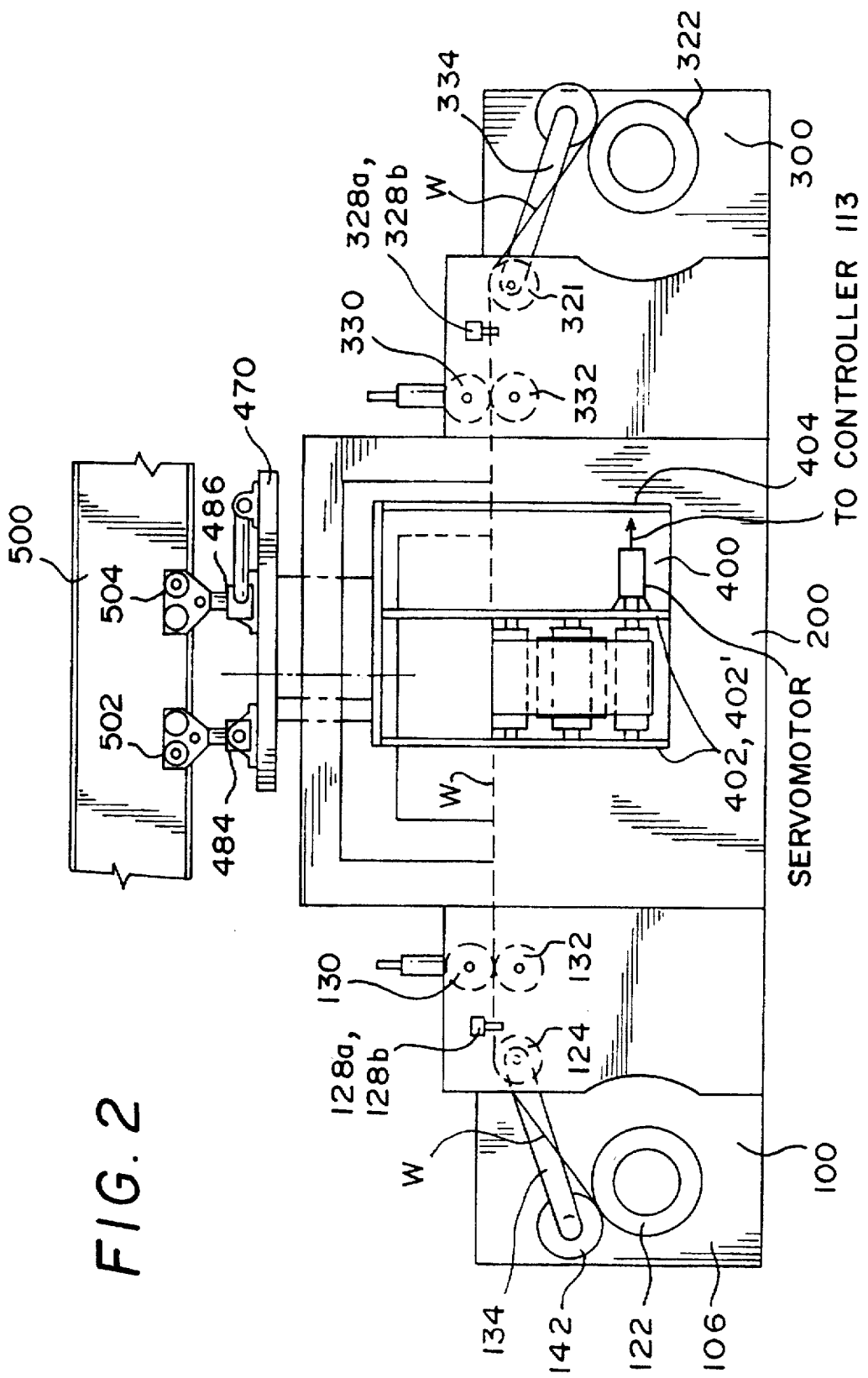
FIG. 2 is a schematic side view of the cross-ply apparatus depicted in FIG. 1, looking from right to left in FIG. 1 along the direction of the axis B—B.

Referring now to FIGS. 1 and 2, the apparatus of the present invention is seen to include a first spool assembly 100, a lamination assembly 200, a second spool assembly 300, and a cross-ply assembly 400.

Figure 3:
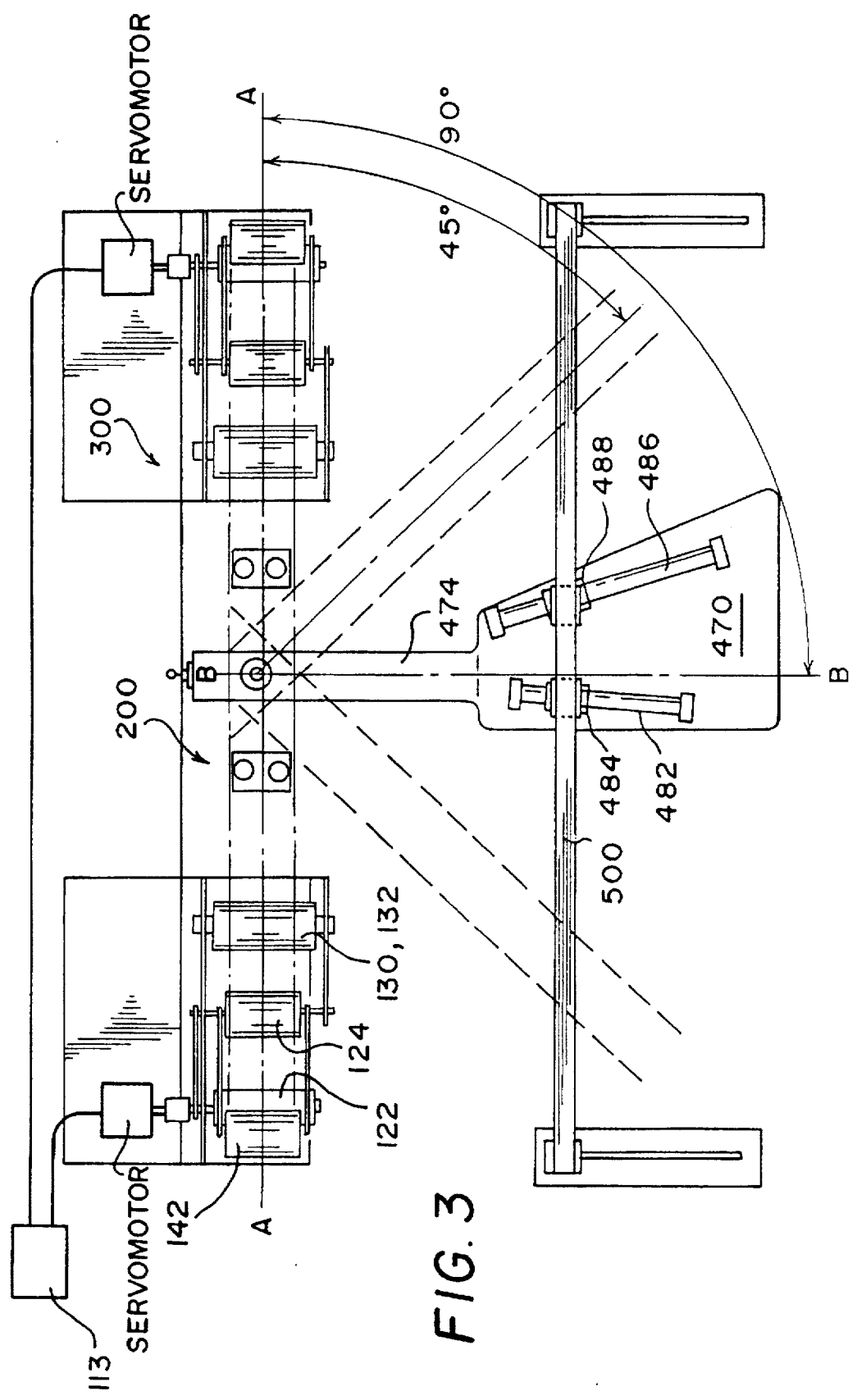
FIG. 3 is a schematic top view of the entire cross-ply apparatus disclosed in FIG. 1.
Figure 5:
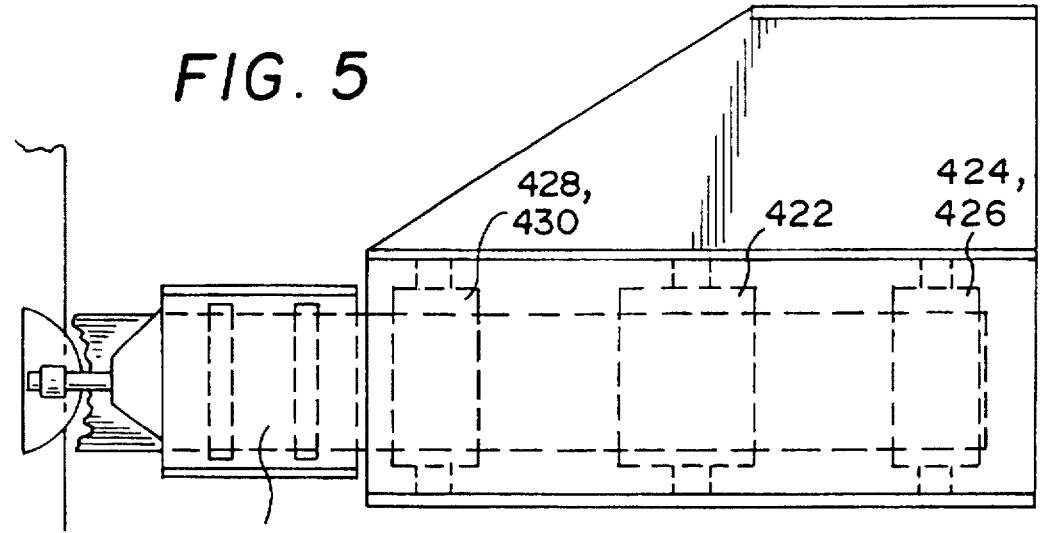
FIG. 5 is a schematic top view of the apparatus shown in FIG. 4.

The first and second spool assemblies are positioned adjacent to, and on opposite sides of, the lamination assembly. The first and second spool assemblies define, with the lamination assembly, a generally linear axis A—A (see FIG. 3). The cross-ply assembly 400, itself, has an elongated frame which defines an axis B—B which, in the context of this invention, is not collinear with the axis A—A.

Where used in this description, the term "outer" refers to locations close to the viewer, while the term "inner" refers to locations farther away from the viewer.

The present invention contemplates that the first and second spool assemblies are to be used interchangeably for the supply and take-up of web material. The first and second spool assemblies are substantially functionally identical.

Moreover, the first and second spool assemblies are substantially structurally identical. The location of the components in the two spool assemblies is reversed (see FIG. 2); that is, the location of the components in the first spool assembly is the mirror image of the location of components in the second spool assembly. This similarity of apparatus is for the purpose of using one spool assembly for supply of the web material, when using the other spool assembly for the take-up of the web material, and vice versa. Thus, in accordance with the teachings of the present invention, the direction of web supply between the first and second spool assemblies is reversible. Such a relationship is desirable when it is necessary to place more than one layer of cross-ply material on a just-preceding layer of cross-ply material placed on the web travelling between the first and second spool assemblies.

Due to the similarity of the two spool assemblies, only one (assembly 100) is described herein. As shown, the spool assembly 100 may include a frame having a base 102, support walls 104, 106, 108, and wall stabilizing members (shown at 108 in phantom).

Mounted on wall 106 is a first rotatable shaft 112, a second rotatable shaft 114, a third rotatable shaft 116 and a fourth rotatable shaft 118. The third and fourth shafts are spaced apart and disposed one above the other. All the shafts in the spool assemblies 100 and 300 are supported by and between walls 106 and 108.

The first shaft 112 is rotatably driven by a motor (supported behind the wall 106 and not shown here). Mounted on the first shaft is a main supply roll 122 on which is carried a supply of web material W onto which one or more layers of cross-plied material is to be applied.

The web of material W may comprise a base layer of paper composition material, a length of unreinforced composite material, a length of fiber-reinforced composite material with the fibers arranged in the same direction relative to one another ("unidirectional"), a length of fiber-reinforced composite material with the fibers arranged at two angles to one another ("bi-directional") or multiple directions relative to one another ("multi-directional"), or a length of resin film.

A first idler roll 124 is secured on the second shaft 114. The idler roll 124 comprises a cylindrical roller made of stainless steel, aluminum alloy, plastic, or other stable compound, and preferably has a polished or coated surface to resist corrosion, abrasion, etc. The apparatus may also include arms 134, 134' pivotably mounted on opposite ends of the shaft 114, and connected to a shaft 140 on which is supported a second idler roll 142 similar to the first idler roll 124. The weight alone of the roll 142 and the arms 134, 134' may be sufficient to press the roll 142 into contact with the web material wound on the supply roll 122 under normal circumstances; however, in some applications where more pressure is required, the arms 134, 134' can be pneumatically driven. Under the influence of the pneumatic pressure imparted by the arms 134, 134', the roll 142 can apply pressure to the web of material just leaving supply roll 122 to help steady the rate at which the web is payed out.

In any event, the web of material W leaving the supply roll 122 is held in tension by the nip rolls 130 and 132 (described below) located downstream of the roll 122. The idler roll 142 can also be used to sense when the diameter of the web material on the roll 122 reaches a critical dimension indicating that the amount of material remaining on the supply roll 122 is about to run out. This can be done by using position or attitude sensors, or counters. In this way, loss of tension in the web W or of continuity of the web material between opposing supply rollers can be prevented.

For example, with an "end-of-roll" sensor, the apparatus can be stopped before all the web material has been unwound from the roll 122, and a second full supply of web material, e.g., on a second roll, can be spliced or otherwise added. Moreover, using an appropriate sensor, after a first cross-ply layer of material has been deposited on a base or carrier web, before the base web unwinds from the roll 124, the direction of travel of the web can be reversed so that a second layer of cross-ply material can be deposited on the first cross-ply layer.

Real-time determinations of the approach of the end of the material on roll 122 can be accomplished through the use of sensors (eg., located behind panels 104, 106) coupled to the shaft 114 for measuring the rotation of the shaft, and pneumatic cylinders (not shown) each of which includes a piston and piston rod. By coupling the free end of the piston rod with the shaft 114 to apply a rotational force to the shaft, the pivoting arms 134, 134' which support the roll 142 can cause the idler roller 142 to press against the supply roll 122, with the pressure of the pneumatic cylinder being controlled and trimmed by the sensor.

The supply roll 122 and the idler rolls 124 and 142 may also be supported for movement toward and away from panel 106. This movement enables adjustment of the edge of web material W relative to that panel so that the outer edge of the web W can be maintained in alignment with the outer edge region of a press platen and a shear blade edge (see below). Preferably, all three rolls move as a cluster, and movement is controlled via a feedback loop and signals generated by an edge guide sensor 128b. The sensor, carried by support member 128a, can move back and forth along member 128a to accommodate various web widths moving below the sensor.

A first, upper, nip roll 130 and a second, lower, nip roll 132 are located downstream of the edge guide sensor 128b. The two nip rolls are disposed one atop the other in substantial vertical alignment.

The shaft 118 is secured at one location relative to the front panel 106. The shaft 116 is supported for vertical adjustment relative to the shaft 118 to enable selective adjustment of the pressure applied to the web moving beneath the upper roll 130, irrespective of the direction of movement of the web along its horizontal path. Preferably, the roll 130 has a non-stick outer surface. Sensors and linkages (not shown) can provide adjustable control of the pressure which roll 130 applies to the web W.

An index encoder (not shown) may be coupled with the upper nip roll 130 for determining when a predetermined amount of the web W has advanced along the web path from the supply roll into the lamination assembly 200 (see FIGS. 6a and 6b for more details).

The lamination assembly comprises a support portion 202 and a press portion 204. The support portion consists of a frame including forward, rear and side panels to define a support housing on which the press portion is supported.

The press portion includes a housing having corner supports separating side, rear, and front openings. Located within the housing is a platen 206, and a press 208 disposed directly over the platen. The press is suspended or supported from cylinders CC located in the upper portion of the housing on either side thereof. The cylinders cause the press 208 to move up and down in a vertical manner.

An upper shear blade 210 is mounted on the front part of the press 208. A lower shear blade 212 is secured to the support portion of the lamination apparatus. The lower shear blade is coupled to a cylinder and piston assembly 214 in which the piston is capable of vertical motion to cause the shear blade 212 to move up and down. The uppermost edge of blade 212 is beveled, as shown at 216 in FIGS. 4 and 6b, and the beveled portion is located just below the flat platen in the press portion.

Also disposed within the press portion housing is a tray. Initially, the tray is located at the rear of the press portion. The tray is supported for forward and rearward horizontal movement so that it can be positioned beneath the press, yet over the carrier web. The tray is only used when the cross-ply web CPW has a frayed end or an end that needs to be removed. In order to achieve this, the tray will be slid under the portion of the press covering the carrier web, and the cross-ply web will be fed onto and over the tray. At that point, the shear blade will be activated to cut the undesired end of the cross-ply material. Upon completion of this procedure, the tray is moved back with the sheared piece of material attached to it due to the inherent tackiness of the uncured resin in the piece. Then, the cross-ply operation is resumed.

The cross-ply assembly 400 includes a frame having parallel, substantially vertical face plates 402, 402' and 404, a cover plate 406, and spacer members (such as that shown at 408 in FIG. 1) which are connected to, span, and rigidify the face plates between which the cross-ply web supporting components are supported. The spacer members thus maintain the face plates in parallel relationship.

The cover plate 406 may also include a downwardly depending plate (not shown) which can extend parallel with the plate 402 and which will cover the rolls supported on the outside of the plate 402 (note FIG. 1).

A first spindle 412, mounted on the frame of the cross-ply apparatus, comprises a compressed air-inflatable shaft which forms an expandable mandrel. The spindle 412 includes a braking, or drag-imparting, mechanism to slow the rotation of the spindle when needed. The braking mechanism imparts tension to the cross ply web CPW. A supply roll 422 is mounted on the spindle 412 and serves as the supply source for the cross ply web material.

The cross-ply web CPW preferably comprises a base layer of release film or paper composition material and a layer of fiber-reinforced composite material with fibers arranged in the same relative direction ("unidirectional"). Other materials, such as fiber-reinforced composite material with the fibers arranged in two directions ("bi-directional") or multiple directions ("multi-directional"), might also be used as a layer of the cross-ply web CPW.

An idler roll 424 is located forwardly of the supply roll 422 and is mounted on a spindle 414. Located down-stream and substantially vertically above the idler roll 424 is a second idler roll 426 which itself is mounted for free rotation on a spindle 416. Both of the spindles 414 and 416 are supported by, and in a substantially horizontal orientation normal to, the frame front wall 402 of the cross-ply assembly. Coupled with spindle 416 are load cells (not shown) which monitor the tension placed on the idler roller 426 as the cross-ply web material is pulled across the roller 426. Thus, the presence of web material in the web path at roller 426 can be constantly monitored. This is important because if the cross-ply web breaks or if the supply roller runs out of cross-ply web, there will be an immediate loss of tension, and the load cells, sensing such a state, will immediately shut off the apparatus. Loss of tension during the cross-ply operation will thwart the ability to guide the web properly and further will defeat all web locating capabilities and tolerances.

A pair of nip rolls 428 and 430 are located downstream of the idler roll 426, with the lower nip roll 428 being supported on the frame front wall 402 at the same height as the idler roll 426.

Nip rolls 428, 430 are each supported on a respective spindle (not numbered). Nip roll 428 is driven in rotation by a servo drive motor located behind vertical walls 402, and 404. The nip rolls are substantially vertically aligned, with the position of the lower roll 428 being vertically adjustable toward and away from the roll 430.

Figure 4:
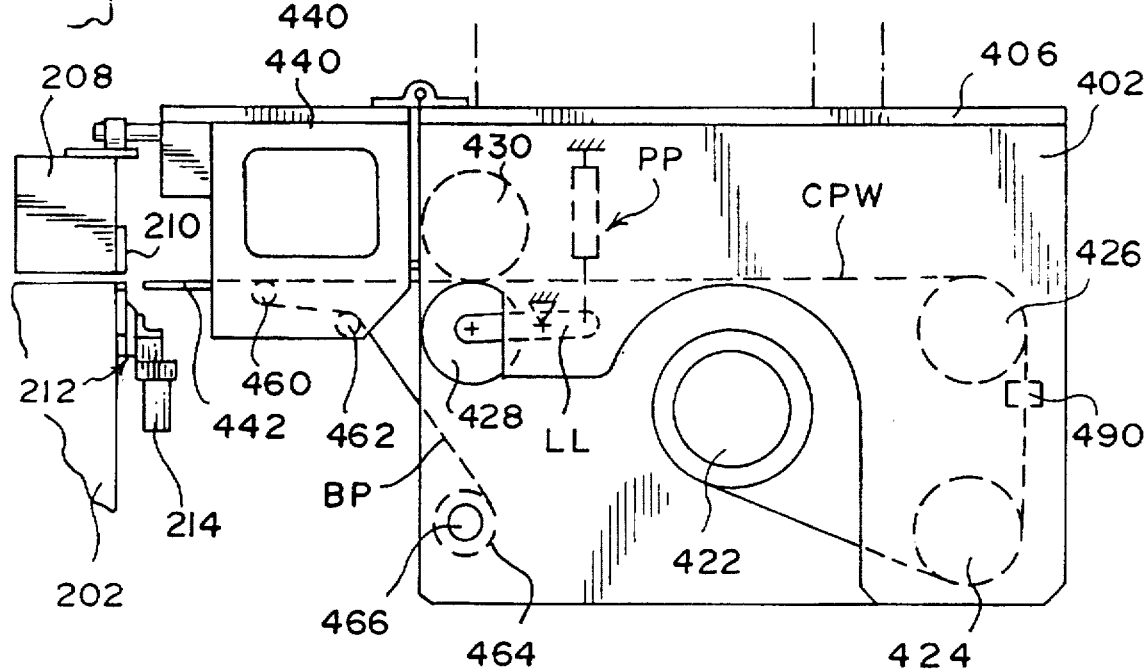
FIG. 4 is a schematic side view of the cross-ply assembly shown in FIG. 1, illustrating the web carriage box, and a shear assembly.

This can be accomplished, by way of example, by an arrangement in which first ends of a pair of parallel linkage elements LL (only one of which is shown in FIG. 4; the other is hidden from view inasmuch as it is directly behind the one shown) are attached to opposite sides of the spindle for roll 428, a mid-point of each element LL is secured to the frame, and the other end of each element is suspended from a piston-cylinder device PP also secured to the frame. Through this arrangement, the linkage elements LL can be pivoted about the mid-point of each element with the result that the roll 428 will be lifted toward and into (firmer) engagement with the roll 430.

As the carrier ply web moves beyond the nip rolls, it enters a web carriage box 440 (see details in FIGS. 28 and 4). The box 440 includes a horizontally extending table 442 positioned at such a level that the web is supported as it travels over the table and toward the lamination assembly 200. The table 442 has a width capable of supporting the carrier ply web CPW as it moves further downstream toward the press of the lamination assembly 200.

Referring specifically now to FIG. 2A, the leading downstream end 444 of the carriage box table 442 has the shape of a substantially truncated polygon with laterally disposed triangular plates 446, 448. The plates are of generally identical configuration, and are connected via hinges to opposite sides of the table, so that the plates can be pivoted downwardly and out of the plane of the table. When either or both of the plates are pivoted out of the plane of the table 442, magnets mounted on the underside of each plate can be used to secure them plates in an out-of-the-way position along the sides of the box assembly 440. The plates are moved out of the plane of the table 442 when the cross-ply assembly is pivoted about swivel point 474 (see the discussion below).

Located immediately under the horizontal table at a forward downstream region thereof are first and second rollers 460, 462. Each of the rollers are supported on spindles for free-wheeling movement. Roller 460 guides backing paper BP which is separated or stripped from one side of the cross-ply web first to the roller 462, and then to roller 464. The backing paper is part of the cross-ply web CPW and is separated from the web CPW by a splitter element 444 located in the plane of the horizontal table. The roller 464 is mounted on a spindle 466 and functions to take up and store the backing paper, which may be used for another application. The roller 464 is not freewheeling, but rather is coupled to the servo-drive motor (not shown) of the nip roller 428. The roller 464 also includes a clutch for coordinating the take-up speed for the backing paper with the tape drive speed of the nip roller 428, thus enabling control of backing paper web tension during its take-up.

The cross-ply assembly 400 is suspended from above, as for example, on a ceiling-mounted beam 500, which may include flanges or like surfaces. Bearing members 502, 504 support the assembly 400 on the beam, and may comprise rollers, wheels, sliders, etc. for engagement with the beam.

A support plate 470 is attached to the upper surface of the cross-ply assembly 400. The support plate extends the entire length of the cross ply assembly 400 along the axis B—B, and includes a narrow extension 472 which overhangs the end of the cross-ply assembly disposed adjacent the lamination assembly 200. The extension 472 is pivotably coupled to the upper surface of the press housing at a pivot member 474. By virtue of this pivot member, the support plate 470 is able to be swung from side to side along the support beam 500, thereby allowing pivoting motion of the cross-ply assembly 400 laterally from one side to the other. A first linear slide bar 482 is coupled to one bearing member 502 through a bearing box 484, while a second linear slide bar 486 is coupled to the other bearing member 504 through a bearing box 488. The linear slide bars enable the bearing boxes to slide therealong as the cross-ply assembly is swung from side to side relative to the lamination assembly 200, thereby facilitating accurate positioning of the cross-ply assembly 400 relative to the carrier ply web W in order to effect a predetermined cross-ply orientation.

An edge guide 490 (see FIG. 1) is located between the rollers 424 and 426 on the cross-ply assembly. The guide is shown at 490, and it assures that the cross-ply web CPW is laterally aligned along the cross-ply path so that the web will make proper entry into the the press assembly opening.

To accomplish the cross-ply procedure, it is necessary to effect movements of the cross-ply web CPW and the carrier web W one after the other. Such sequential actuation is provided by a controller 113 (see FIG. 3). The controller 113 is connected to the three servomotors shown in FIGS. 2 and 3 which actuate shafts 112, 466 and roll 322. First, the carrier web W is moved so that a pre-identified portion is positioned in front of the lamination unit 200. Then, the cross-ply web CPW is advanced a specified "index" distance toward the carrier web W. This "index" distance is determined as a function of the respective widths of the two webs (eg., if the carrier web W is 12 inches wide, the cross-ply web CPW must be moved 12 inches forwardly (i.e., "indexed") toward the lamination assembly 200.

Once the indexed movements of the webs take place, the press member is lowered into engagement with the overlapping web portions, and the shear is actuated to sever the segment of the cross-ply web positioned atop the carrier web W from the remainder of the length of cross-ply web being advanced toward the lamination assembly 200.

Thereafter, the shear retracts, the press member is lifted, and the webs are both caused to move their "index" amounts to begin the process anew. Through such indexing, the carrier web carries the just-cut cross-ply segment to a position which is down the path of travel of the carrier ply a distance sufficient to accommodate the next indexed amount of forward travel of the cross-ply web.

The steps described above are sequentially repeated until nearly the entire length of carrier web has been covered by indexed segments of cross-ply web material. At such time that nearly all, except a trailing end portion, of the carrier web from the supply roll 122 has been covered by segments of the cross-ply web material and then taken up by the roll 322, operation of the apparatus is halted, and then, when the cross-ply web has been replenished with a new supply roll, the direction of movement of the carrier web W is reversed. The trailing end portion of the carrier web is then fed between the nip rolls 130, 132 and around roll 124 back to the "new" take-up roll 122 thus becoming the leading end of the web.

When the apparatus is started, the cross-ply web CPW and the carrier web W once again travel with simultaneous indexed movements, with motion of the carrier web W being reversed. The operation of the cross-ply apparatus, and the direction of travel of the cross-ply web CPW, are not affected by the direction of travel of the carrier web W.

While the operation of the apparatus of the present invention described above results in a lamination of cross-ply web segments onto a carrier web at a 90° angle, the invention also contemplates providing segments of cross-ply web placed atop the carrier web W at angles of other than 90°. In such cases, the indexing movement of the carrier ply web and the cross-ply web need to be redefined.

For example, where the cross-ply web is to be applied at an angle of 45° to the carrier web, the index distance is determined by multiplying the cosine of 45° times the width of the carrier ply W.

While the present invention has been described in conjunction with specific embodiments thereof, it is evident that many alternatives, modifications, and variations will be apparent to those skilled in the art in light of the foregoing description. Accordingly, the present invention is intended to embrace all alternatives, modifications, and variations which fall within the spirit and scope of the appended claims.

What we claim is:

1. A method for applying segments of a second cross-ply tape on the top of a first carrier tape, said method comprising:

supporting said first tape for travel between first and second stations along a linear path, positioning press means and severing means at a location on said path between said first and second stations, moving said first tape a predetermined distance toward said location along said path, said distance being proportional to the width of said second tape, moving said second tape toward said press means a distance proportional to the width of said first tape, sequentially moving said first and second tapes, as well as said press and severing means such that, for each predetermined distance that said first tape is moved toward said location along said path, a layer of said second tape is deposited on said first tape, and before the first tape is moved again along said path said predetermined distance, the press means is actuated and then the second tape is severed, and reversing the direction of movement of said first tape along said path so that at least one other layer of said second tape can be applied to said first tape.

2. The method of claim 1, wherein said step of moving said second tape comprises stripping any backing layer from said second tape, delivering the second tape to said location, and storing said backing layer at a location remote from said first tape.

3. The method of claim 1, wherein said step of moving said second tape includes a further step of changing the angle of approach of said second tape relative to said first tape.

4. The method of claim 3, wherein said step of changing the angle of approach of said second tape relative to said first tape comprises pivoting said second tape relative to said first tape.

5. An apparatus for applying segments of a second cross-ply tape on the top of a first carrier tape, said apparatus comprising:

first and second modules for supporting said carrier tape, said first and second modules being arranged so as to define a linear path along which said carrier tape travels, a lamination assembly positioned along said linear path between said first and second modules, said lamination assembly including press means and severing means, means for moving said carrier tape a predetermined distance through said lamination assembly and along said path, said distance being proportional to the width of said second tape, means for moving said second tape toward said lamination assembly a distance proportional to the width of said carrier tape, means for sequentially actuating said carrier tape moving means, said second tape moving means, and said severing means such that, for each predetermined distance that said carrier tape is moved into said lamination assembly, a layer of said second tape is deposited on said carrier tape, and before the carrier tape is moved again along said path said predetermined distance, the press means is actuated and then the second tape is severed, and means for reversing the direction of movement of said carrier tape along said path so that at least one other layer of said second tape can be applied to said carrier tape.

6. The apparatus of claim 5, wherein said lamination assembly includes a platen for supporting said carrier tape as it moves along said path.

7. The apparatus of claim 5, wherein said carrier tape is carried on rolls in each of said first and second modules, and said means for moving said carrier tape a predetermined distance along said path comprises shafts for supporting said rolls.

8. The apparatus of claim 5, wherein said carrier tape is carried on rolls in each of said first and second modules, and said means for moving said carrier tape a predetermined distance along said path comprises shafts for supporting said rolls and a motor coupled with one of said shafts.

9. The apparatus of claim 5, wherein said means for moving said second tape toward said lamination assembly includes frame means for rotatably supporting said second tape, and motor means, coupled with said means for moving said carrier tape through said lamination assembly, for driving said second tape toward said lamination assembly.

10. The apparatus of claim 9, and further including table means, at the portion of said frame means adjacent said lamination assembly, for supporting the portion of said second tape being advanced toward said lamination assembly.

11. The apparatus of claim 10, wherein said table means includes edge means for separating the second tape from a base support layer, and further including a take-up roller for storing the base support layer after it has been separated from the second tape.

12. The apparatus of claim 10, wherein said table means has a planar portion including a forward region having distinct lateral segments, each of said segments being selectively removable from said plane when the position of said means for moving said second tape toward the lamination assembly is shifted angularly.

13. The apparatus of claim 9, wherein said means for moving said second tape toward said lamination assembly includes means for changing the angle of approach of said second tape relative to said carrier tape.

14. The apparatus of claim 13, wherein said angle of approach is between approximately ±30° and substantially 90°.

15. The apparatus of claim 13, wherein said means for changing the angle of approach of said second tape relative to said carrier tape comprises pivot means coupling said lamination assembly with one region of said frame means, and means for pivoting said frame means about said pivot means.

16. The apparatus of claim 15, and further including means for supporting another region of said frame means, said means for pivoting said frame means about said pivot means being disposed between said pivot means and said means for supporting another region of said frame means.

17. The apparatus of claim 16, wherein said means for supporting another region of said frame means comprises an overhead beam, and said means for pivoting said frame means about said pivot means comprises roller means riding on said overhead beam.

* * * * *